(12) United States Patent
Champ et al.

(10) Patent No.: US 7,374,242 B2
(45) Date of Patent: May 20, 2008

(54) SEAT LATCH ASSEMBLY FOR A REAR ROW STANDING SEAT INCLUDING A SLOTTED INERTIAL LOCK PLATE WITH RESISTIVE SUPPORT IN BOTH DESIGN AND UPRIGHT POSITIONS

(75) Inventors: William Champ, Mt. Clemens, MI (US); David Grable, Clinton Township, MI (US)

(73) Assignee: BAE Industries, Inc., Auburn Hills, MI (US)

( * ) Notice: Subject to any disclaimer, the term of this patent is extended or adjusted under 35 U.S.C. 154(b) by 42 days.

(21) Appl. No.: 11/439,665

(22) Filed: May 24, 2006

(65) Prior Publication Data

US 2007/0273170 A1  Nov. 29, 2007

(51) Int. Cl.
*B60N 2/30* (2006.01)
*B60N 2/00* (2006.01)
(52) U.S. Cl. .................... 297/331; 297/335; 296/65.05
(58) Field of Classification Search ................ 297/331, 297/332, 333, 335; 296/65.05
See application file for complete search history.

(56) References Cited

U.S. PATENT DOCUMENTS

| 5,156,437 | A | * | 10/1992 | Hayakawa et al. ......... 297/335 |
|---|---|---|---|---|
| 5,156,438 | A | * | 10/1992 | Hayakawa et al. ......... 297/335 |
| 5,158,338 | A | * | 10/1992 | Hayakawa et al. ......... 297/335 |
| 5,195,802 | A | * | 3/1993 | Hayakawa et al. ......... 297/335 |
| 5,320,411 | A | * | 6/1994 | Sera ........................... 297/335 |
| 5,425,568 | A | * | 6/1995 | Sliney et al. .......... 297/378.11 |
| 5,460,429 | A |   | 10/1995 | Whalen |
| 5,476,307 | A |   | 12/1995 | Whalen |
| 5,800,015 | A | * | 9/1998 | Tsuchiya et al. ............ 297/331 |
| 5,842,744 | A |   | 12/1998 | Harmon |
| 6,012,771 | A |   | 1/2000 | Shea |
| 6,481,799 | B1 |   | 11/2002 | Whalen |
| 6,767,061 | B2 |   | 7/2004 | Ogino et al. |
| 6,832,815 | B2 |   | 12/2004 | O'Connor |
| 6,883,854 | B2 | * | 4/2005 | Daniel .................... 297/335 X |
| 6,883,868 | B2 | * | 4/2005 | Yoshida ...................... 297/331 |
| 7,086,696 | B2 | * | 8/2006 | Yudovich .................... 297/335 |
| 7,201,425 | B2 | * | 4/2007 | Tsujibayashi et al. ... 297/335 X |
| 7,252,320 | B2 | * | 8/2007 | Tsujibayashi et al. ... 297/335 X |
| 2005/0146186 | A1 | * | 7/2005 | Kinnou et al. .............. 297/331 |

FOREIGN PATENT DOCUMENTS

JP        2002127796 A      5/2002

* cited by examiner

*Primary Examiner*—Rodney B. White
(74) *Attorney, Agent, or Firm*—Gifford, Krass, Sprinkle, Anderson & Citkowski, P.C.

(57) ABSTRACT

A vehicle latch assembly including a stanchion support and a pivotally secured seat supporting bracket. A batwing shape sector is slaved to rotate with the bracket between the bracket and stanchion support. A sector bottom surface is interrupted by a shoulder projection and an arcuate interior channel is offset from a slaved rotating connection of the sector to the bracket. A pin extends through another channel defined in the stanchion and seats within the sector channel to bias the sector during travel along the interior channel. A pendulum is secured in sandwiching fashion between the bracket and stanchion and includes an upper edge configuration proximate a selected location of the bottom surface of the rotatable sector, depending upon a rotatable position established between the first seat component and a second seat component. The pendulum responds to an inertial impact condition by engaging the shoulder projection to prevent rotation of the first seat component.

20 Claims, 7 Drawing Sheets

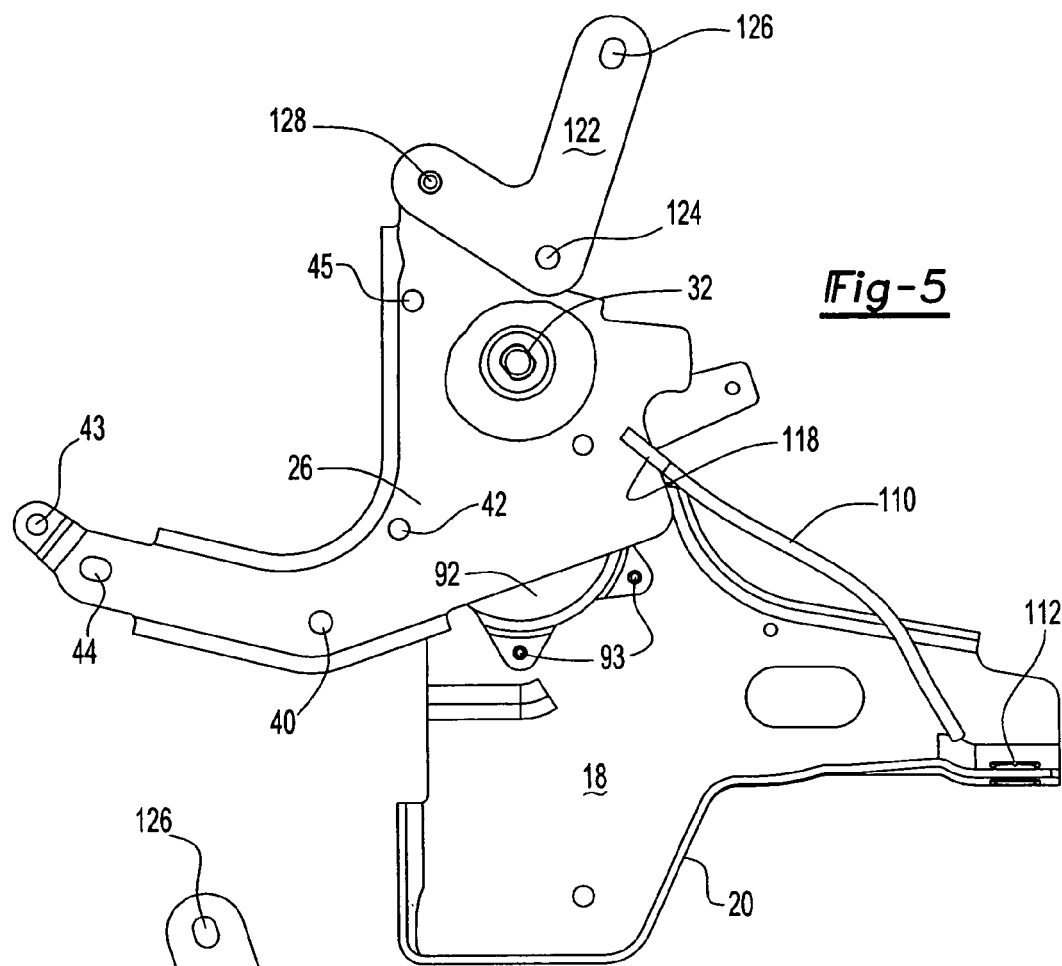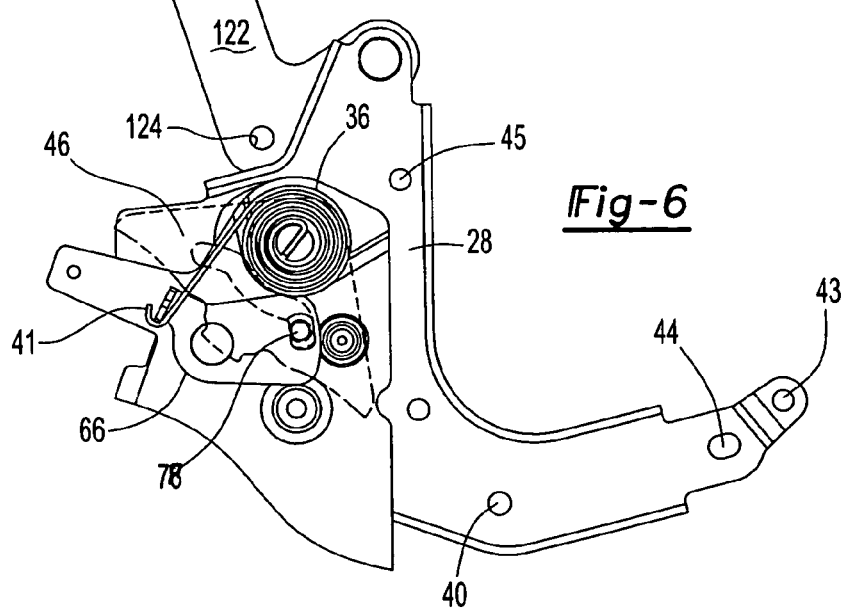

SEAT LATCH ASSEMBLY FOR A REAR ROW STANDING SEAT INCLUDING A SLOTTED INERTIAL LOCK PLATE WITH RESISTIVE SUPPORT IN BOTH DESIGN AND UPRIGHT POSITIONS

BACKGROUND OF THE INVENTION

1. Field of the Invention

The present invention relates generally an inertial locking assembly in use with a pivoting seat. More specifically, the present invention teaches a rear-row stadium style seat in use with such as a pickup truck type vehicle and which in particular utilizes a foldable seat bottom. A pendulum actuated inertial locking mechanism incorporates a batwing shaped sector exhibiting a unique arcuate profile for facilitating rotating motion of the seat bottom between design and upwardly folded stowed positions, as well as providing a degree of resistive support at both extreme locations to prevent inadvertent rotation of the seat bottom.

2. Description of the Prior Art

The prior art is well documented with examples of seat fold mechanisms for use with such as rear row vehicle seats. In particular, such seat fold mechanisms are known which are in use with "stadium style" seat assemblies incorporating a pivotal seat bottom (such as associated with a pickup rear seat), and which is convertible between a use/design position and an upwardly folded/stowed position.

A first example of a prior art stadium style seat fold mechanism is set forth in U.S. Pat. No. 6,012,771, issued to Shea, and which discloses a seat bottom pivotally mounted relative to a seat back and movable between a seating position and an upright folded position. A detent mechanism provides a degree of resistance to movement of the seat bottom from the folded upright and the seating position. An inertia latch mechanism is provided for engaging the seat bottom in the folded upright position in response to a rapid deceleration of the vehicle such as caused by a collision.

U.S. Pat. No. 5,842,744, issued to Harmon, teaches a seat dual position locking mechanism for locking a seat component in a stowed or use position for preventing sudden pivotal movement of the seat component in a sudden high energy acceleration or deceleration. The locking mechanism includes a support bracket adapted for mounting on the vehicle floor and a pivot plate pivotally mounted to the support bracket. The pivot plate is secured to the vehicle seat component for pivotal movement therewith. The pivot plate includes a plurality of lock teeth extending therefrom. A pendulum member or pawl is pivotally connected to the support bracket and operative for locking engagement with the lock teeth for preventing substantial seat component movement in a forward or rearward high energy impact.

O'Connor, U.S. Pat. No. 6,832,815, teaches a seat latch assembly which includes a seat bottom and associated first frame member, a seat back and second frame member partially mounted on the first frame member about a first pivot, and a latch mechanism. The latch mechanism includes a pin mounted on one of the first and second frame members. The latch pivotally attaches to the other of the first and second frame members about a second pivot. Of note, the latch has an open angled hook portion and is movable about the second pivot between disengaged and engaged positions, and dependent upon whether the hook is in contact or spaced from the pin in order to selectively prevent the first frame member from pivoting relative to the second frame member about the first pivot.

U.S. Pat. No. 5,476,307, issued to Whalen, teaches an inertia sensitive hinge mechanism including an inertia activator with first and second cam surfaces and a wedging surface located therebetween. The inertial activator includes a center of gravity spaced from the center of rotation. Of note, an upper hinge member includes an arcuate cam surface on opposing plates for receiving a pin. The pin travels between first and second opposite ends separated by a slot exhibiting a continuous arcuate curvature.

Finally, U.S. Pat. No, 6,767,061, issued to Ogino, teaches a tip-up seat including a rock unit which holds the seat cushion in at least one position. The seat includes a seat back, a seat cushion, and a tip-up unit which tips up a forward end side of the seat cushion from a base position to an upward tip-up position. The rock unit holds the seat cushion in at least one position between the base and tip-up positions and includes a first gear and a second gear mutually engaged to permit tip-up motion of the seat cushion and to restrict the tip-down motion of the seat cushion.

SUMMARY OF THE PRESENT INVENTION

The present invention discloses an inertial locking assembly in use with a pivoting seat. More specifically, the present invention teaches a rear-row stadium style seat in use with such as a pickup truck type vehicle and which utilizes first and second pairs of spaced apart stanchion supports and pivotally associated brackets being arranged on opposite ends of first and second seat components associated with a 60/40 rear stadium seat assembly. In this arrangement, a first latch assembly is typically arranged on a first side of a first selected seat component, whereas a second latch assembly is arranged on a second opposite most side of a second selected seat component.

A pendulum actuated inertial locking mechanism incorporates a batwing shaped sector exhibiting a unique arcuate profile for facilitating rotating motion of the seat bottom between design and upwardly folded stowed positions, as well as providing a degree of resistive support at both extreme locations to prevent inadvertent rotation of the seat bottom. The seat bottom sector includes a substantially planar shape sector exhibiting the substantially batwing outer profile along first and second sides, and further includes first and second bottom extending surfaces interrupted by an intermediate shoulder projection. The sector is mounted in sandwiching fashion between a rotatively slaved and associated pivoting seat bottom bracket and upwardly extending support stanchion.

The sector further exhibits an arcuate interior channel offset from a slaved rotating connection of the sector to the slaved bracket. The arcuate channel includes a middle arcuate portion and first and second reverse arcuate extending end portions, these corresponding to design and stowed positions associated with rotation of the first seat component (seat bottom) relative to an upwardly extending second seat component (or seat back).

A detent lever is biasingly and rotatingly secured against a surface of the stanchion support opposite the sector and pendulum. A pin extends from the detent through a further channel defined in the stanchion support and in a combined communicating and offsetting fashion relative to the sector channel in order to exert a bias against the sector during travel along the interior channel corresponding to the rotation of the seat component. A clock spring is mounted to the main pivot pin which is secured to the seat bottom bracket and sector, and includes an extending end engaging a location associated with the detent lever in order to simultaneously provide bias to the extending pin and the seat bottom bracket.

An inertial responsive leaf spring is secured to the sector in substantially aligning and interposing fashion between the first and second bottom extending surfaces separated by the shoulder projection and proximately located upper edge configuration of the pendulum. In this fashion, the pendulum is secured in sandwiching fashion between the bracket and stanchion and includes an upper edge configuration selectively seating proximate a location associated with the bottom extending surfaces of the rotatable sector.

The configuration of the rotating sector, pendulum, and inertial responsive springs are such that the batwing sector is permitted substantially unimpeded motion upon pivoting of the first seat component (bottom) relative to the second seat component (back). The reverse bend configuration associated with the first and second end portions of the arcuate and pin receiving channel further provide an intended degree of resistive support at either angled slot end location corresponding to extended/design or upright/stowed positions of the seat bottom, providing both an additional level of tactile feel when the rotatable seat component has achieved a desired converted position, as well as assisting against inadvertent rotation of the seat bottom in cooperation with the architecture associated with the inertial locking assembly.

The pendulum is further permitted a slight degree of rotational support by virtue of a three-dimensional shaped cover plate secured to the stanchion support, providing a combined level of support and limited pivoting motion associated with the pendulum. The pendulum is constructed to engage the shoulder abutment associated with the batwing shaped sector in response to an inertial impact condition, and to prevent rotation of the first seat component.

Additional features associated with the present invention include a rubberized motion dampening projection extending from the stanchion support and contacting a location associated with a weighted end portion of the pendulum. An angularly shaped component is pivotally connected at one extending edge to an upper end location associated with the pivot bracket, such that the second seat component (seat back) is fixedly secured to angularly redirected portion associated with the component. Upon rotation of the bracket and slaved planar shaped sector, a degree of rearward angular displacement of the second seat (back) component is achieved, and which concurrent with the slaved rotation of the batwing seat sector, indicating upwardly folding of the first seat component to a stowed position, provides for a more secure holding arrangement of the stadium-style seat in the stowed position.

BRIEF DESCRIPTION OF THE DRAWINGS

Reference will now be made to the attached drawings, when read in combination with the following detailed description, wherein like reference numerals refer to like parts throughout the several views, and in which:

FIG. 5 is a front plan view of the seat latch mechanism of FIG. 3;

FIG. 6 is a 180° rotated plan view of the latch mechanism shown in FIG. 5;

DETAILED DESCRIPTION OF THE PREFERRED EMBODIMENTS

Figure 1:
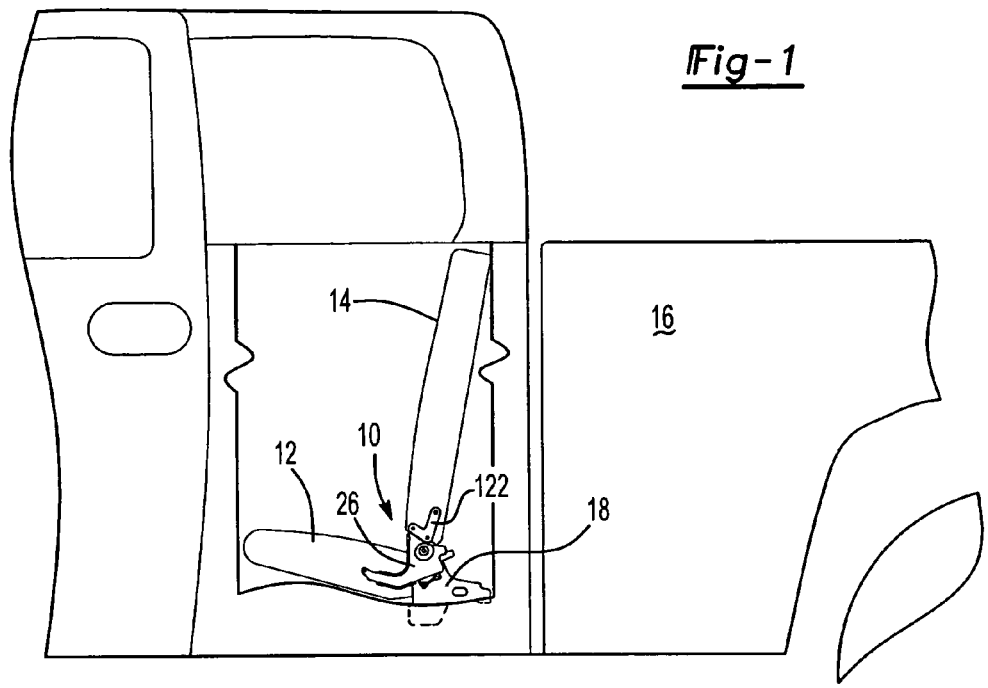
FIG. 1 is an environmental plan view in partial cutaway illustrating the seat latch assembly in a design position with the seat bottom downwardly folded.

Referring now to FIG. 1, an environmental plan view is illustrated in partial cutaway of a seat latch assembly 10 in a design position, and illustrating a seat bottom 12 downwardly folded relative to a seat back 14 according to the present invention.

As previously discussed, the present invention teaches a rear-row stadium style seat in use with such as a pickup truck type vehicle 16, and which typically utilizes pair of latch assemblies incorporated into stanchion supports and associated pivoting brackets arranged on opposite ends of first and second seat frame components, these typically associated with what is known as a 60/40 rear stadium seat assembly. In this arrangement, a first latch assembly is typically arranged on a first side of a first selected seat component (e.g. 60% stadium seat), whereas a second latch assembly is arranged on a second opposite most side of a second selected seat component (40% adjoining stadium seat). It is also understood that other seat supporting arrangements, beyond those illustrated herein, are contemplated without limitation.

Figure 2:
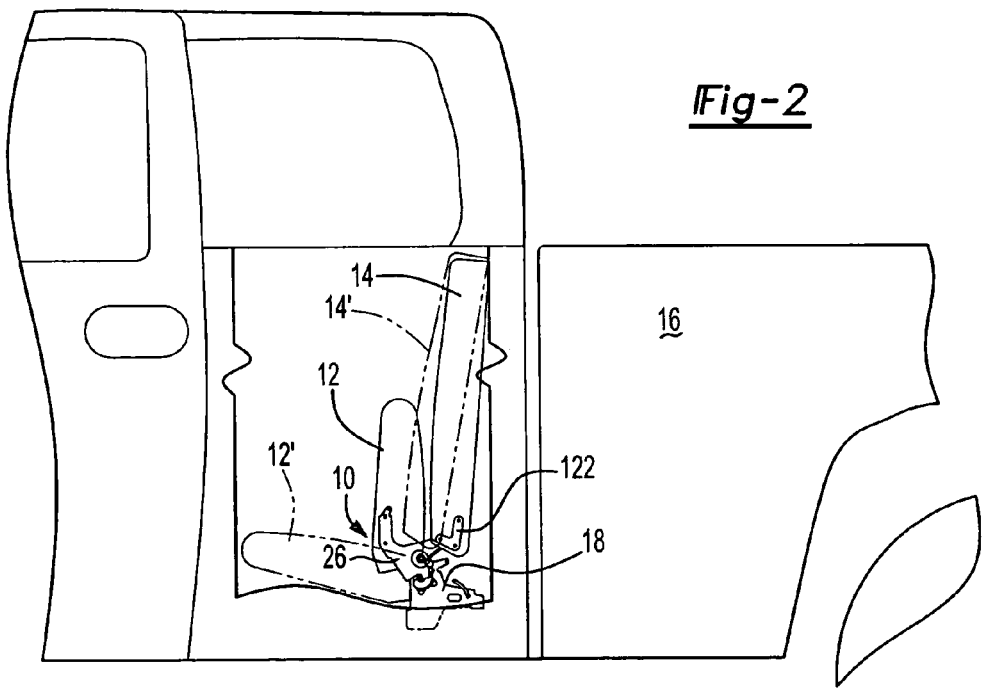
FIG. 2 is a further environmental plan view illustrating the range of pivotal motion of the seat bottom between the design position of FIG. 1, and an upwardly folded stowed position, and further illustrating a corresponding rearward angular displacement of the seat back during upward pivoting of the seat bottom.

FIG. 2 is a further environmental plan view and illustrating the range of pivotal motion of the seat bottom 12 between the design position of FIG. 1 (also shown in phantom at 12' in FIG. 2), and an upwardly folded stowed position 12. FIG. 2 further illustrates a corresponding rearward angular displacement of the seat back, from phantom position 14' to 14, during corresponding upward pivoting of the seat bottom 12. As will be further explained in detail, corresponding rearward angular displacement of the seat back provides for a more secure holding arrangement of the stadium-style seat in the stowed position.

Figure 3:
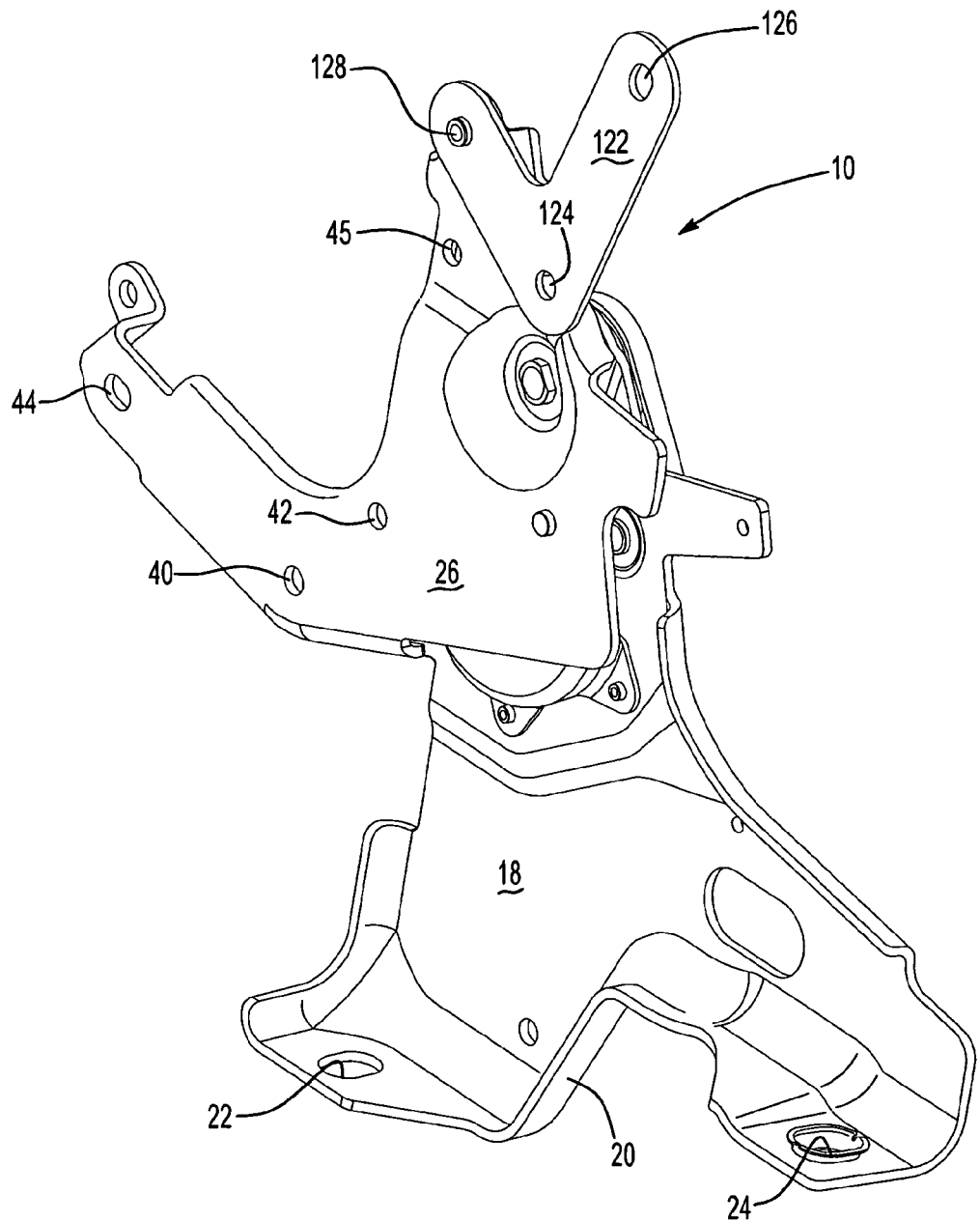
FIG. 3 is a perspective view of the seat latch mechanism in a design position configuration and according to the present invention.

Referring now to the perspective view of the seat latch mechanism as shown in the design position configuration of FIG. 3, in cooperation with the exploded view of FIG. 4 and the succeeding views of FIGS. 5-8, latch assembly 10 will now be described in greater detail. Specifically, the latch assembly 10 is incorporated into a vehicle seat including a stanchion support 18 secured to a floor location of the vehicle (see again FIGS. 1 and 2). As described previously, a preferred variant contemplates a 60/40 stadium seat assembly and by which first and second pairs of stanchion supports (not shown) define opposite frame supporting ends of a pair of likewise width dimensioned seat components 12.

Figure 4:
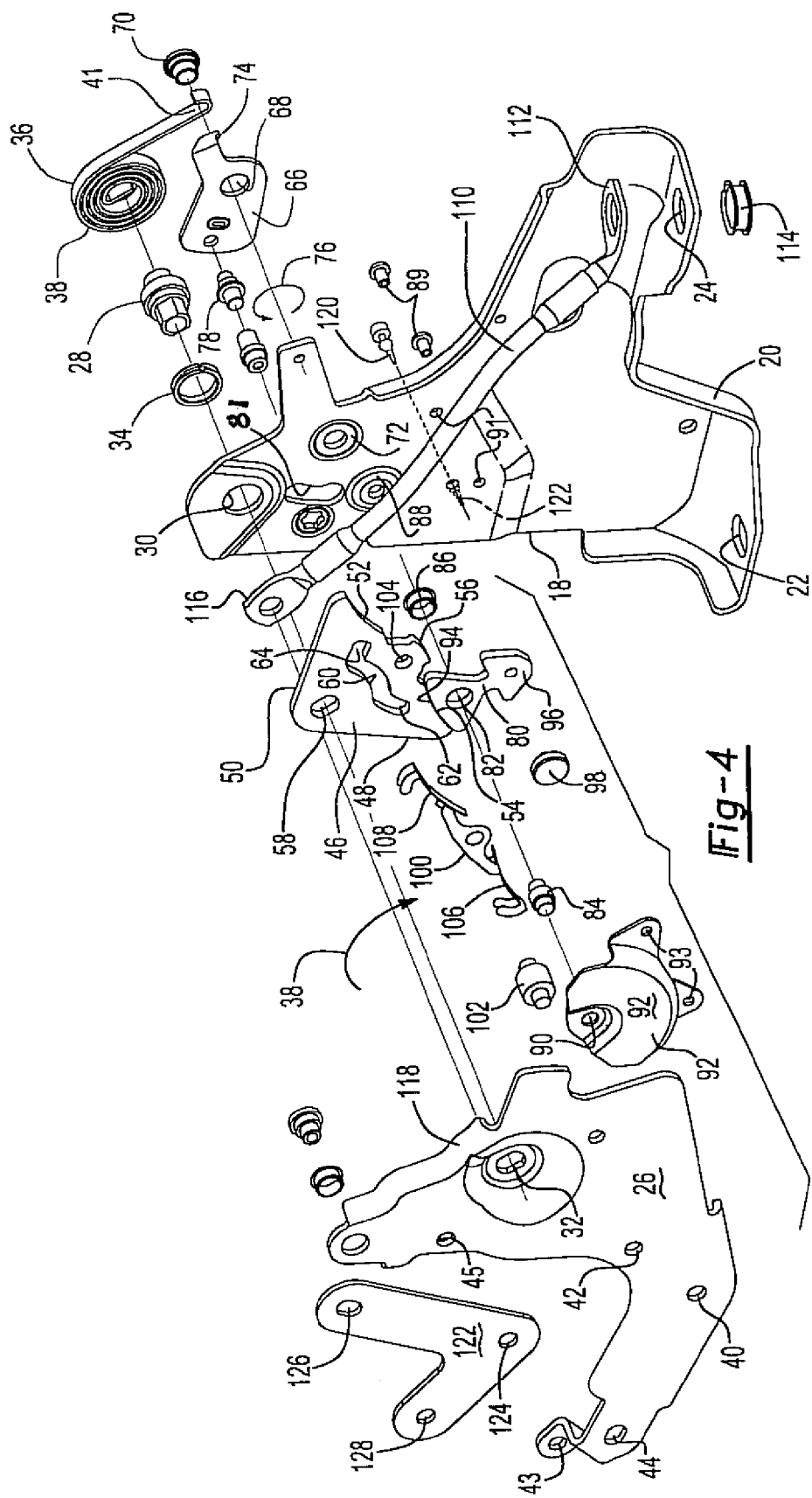
FIG. 4 is an exploded view of the seat latch mechanism according to the present invention.
Figure 7:
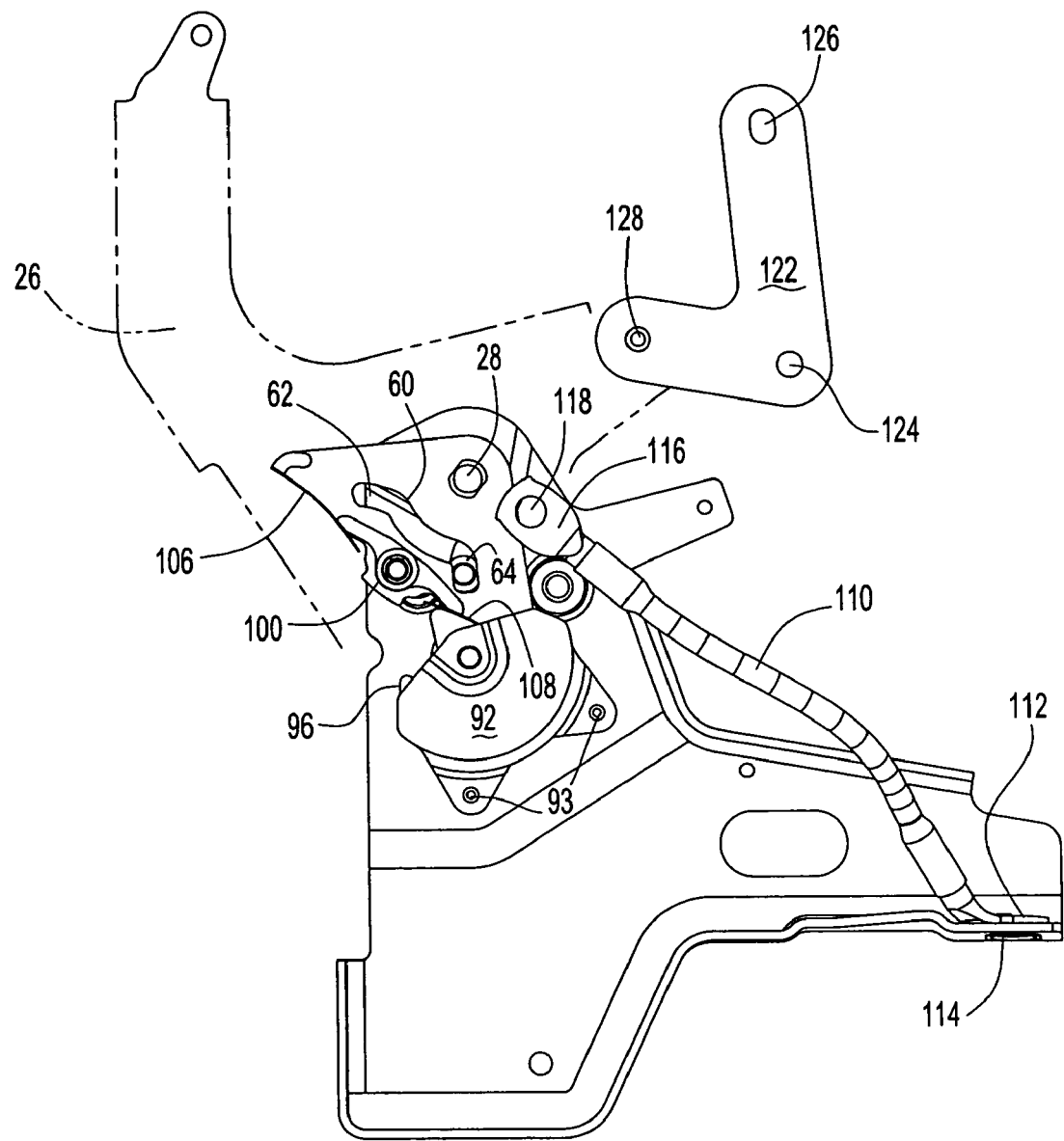
FIG. 7 is an illustration similar to that shown in FIG. 5, with the seat bottom bracket shown in outline only and further illustrating the range of pivoting motion of the latch mechanism to the upright stowed position, also referenced in FIG. 2.
Figure 8:
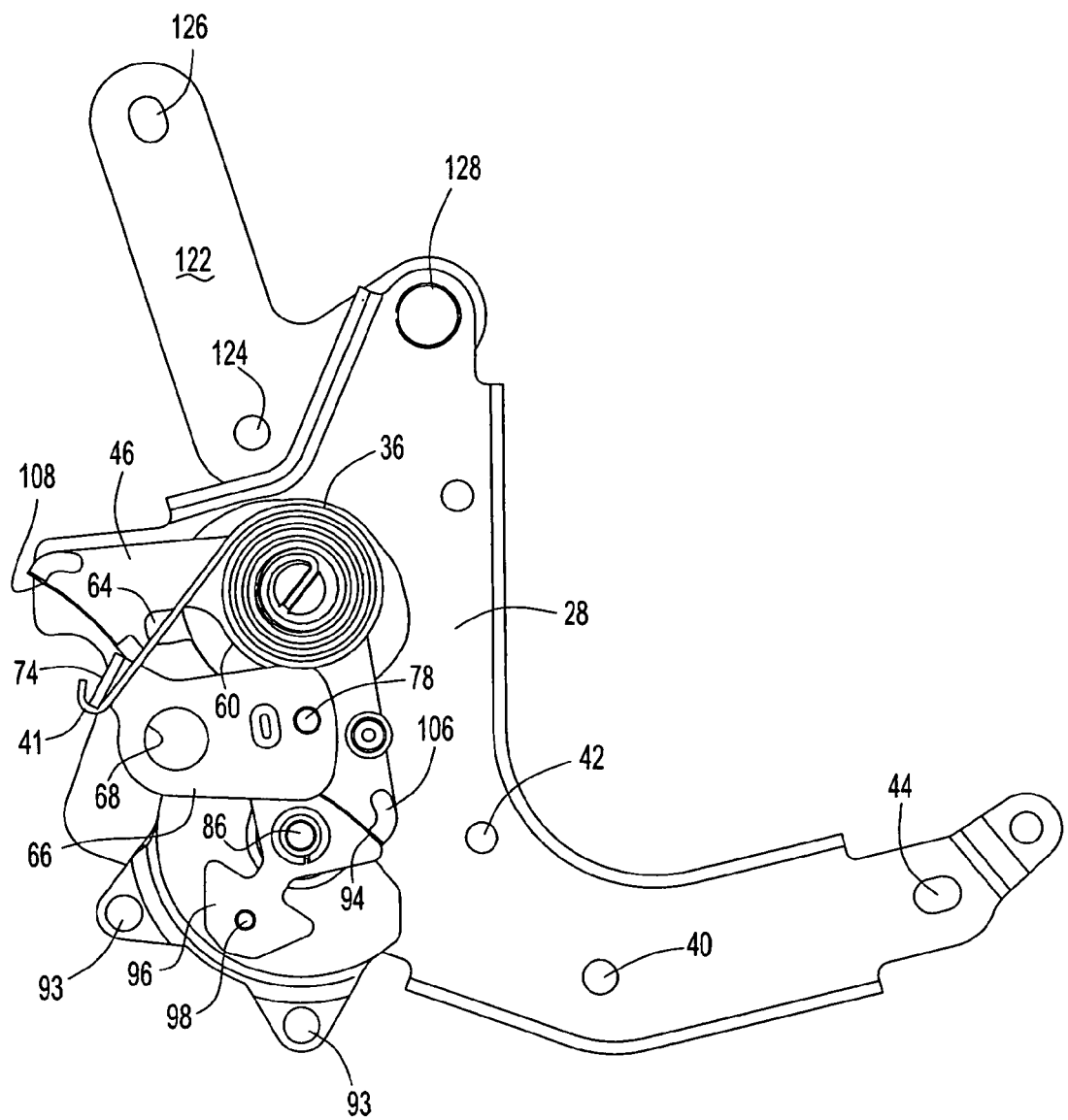
FIG. 8 is a 180° rotated plan view of mechanism shown in FIG. 7, similar to the previous illustration of FIG. 6, and illustrating the arrangement of the inertial lock pendulum in cooperation with the batwing sector according to the present invention.

As best shown in the exploded view of FIG. 4, the stanchion support 18 is constructed of a steel material and includes a substantially planar shaped and configured body and a curled and extending lower portion 20 secured upon the floor of the vehicle by aperture locations 22 and 24. A bracket 26 is also constructed of suitable steel grade material and exhibits a substantially planar shaped and arcuate extending body.

The bracket 26 is pivotally associated with the stanchion support 18 through the insertion of a main seat pivot pin 28, which extends through aligning apertures defined in the stanchion support, at 30, as well as the pivoting bracket, at 32. The pivot 28 is guided by a bushing 34 which has flanges on both sides of stanchion 18 when installed through aperture 30.

A rotatively biasing clock spring 36 includes an innermost extending portion 38 seating within a notched end associated with the pivot pin 28 and in order to bias the bracket 26 in a clockwise rotational direction (see arrow 38 in FIG. 4). The clock spring 36 further includes an outer extending portion terminating in a curled edge 41, the purpose for which will be subsequently explained.

The first rotatable seat component, illustrated again at 12 in FIGS. 1 and 2, is secured to locations associated with the bracket, such as through the use of fasteners (not shown), these extending through mounting apertures 40 and 44 (FIG. 4) and in order to secure an associated side of the first seat component to the bracket 26. Additional holes 42, 43, 45 are provided for plastic trim cover attachment fasteners, but are not necessary to the present mechanism. As previously explained, a given seat assembly includes a pair of spaced apart stanchion supports and associated brackets; a 60/40 stadium seat assembly including first and second pairs of stanchion and bracket supports, with a selected latch assembly 10 being located on opposite outboard sides of each seat subassembly.

As best illustrated in FIG. 4, a substantially planar shaped sector component is illustrated at 46 and includes a steel or like construction. The sector 46 as illustrated adopts a substantially batwing shape with first and second angled sides 48 and 50, a third side consisting of first and second bottom extending, and slightly arcuately configured, surfaces 52 and 54, interrupted by a central projecting shoulder portion 56 defining opposite abutting edges. The batwing sector 46 is mounted in sandwiching fashion between the stanchion support 18 and pivoting bracket 26, with the pivot pin 28 including a mating profile portion which seats in extending fashion through an elongated mounting aperture 58 associated with the sector, and in order to slave the same in rotating fashion with the bracket 26.

The sector 46 further exhibits an arcuate extending interior channel, which is offset from the slaved rotation of the sector relative to the rotating seat bracket 26. In a preferred configuration, the channel includes a central arcuate component 60, communicating at opposite ends with reverse configured arcuate components 62 and 64. It is however contemplated that other configurations associated with an appropriately arcuately and interiorly defined channel are contemplated within the scope of the invention.

A detent lever 66 is biasingly and rotatingly secured against a surface of the stanchion support 18 opposite the batwing sector 46. The detent lever 66 includes an interior aperture 68, through which a detent pivot 70 engages and which secures the detent lever 66 upon the opposite (inner) facing surface of the stanchion through associated securing aperture 72.

An extending and inwardly curled portion 74 of the detent lever 66 (see again FIG. 4) is engaged by the curled extending end 41 of the clock spring 36 and in order to bias the detent lever 66 in a counterclockwise direction (see arrow 76 in FIG. 4). A pin 78 extends from a further seating location associated with the detent 66, and through a defined in the stanchion support 18 and which extends in a combined communicating and offsetting fashion relative to the sector channel (smile shaped with central arcuate portion 60 and reverse smile end portions 62 and 64). In this manner, an end of the pin 78 seats within the batwing sector arcuate channel and exerts a bias against the sector during associated travel along the overlapping interior channel configuration.

An inertially engaging pendulum 80 is provided and includes a first upper and generally triangular shaped portion mounted in a slightly rotating and sandwiching fashion between the bracket 26 and stanchion support 18. An aperture 82 defined in the upper portion of the pendulum 80 receives an inertial locking rivet 84, this passing through the aperture 82, plastic bushing 86, and mounting location 88 associated with the stanchion support 18, as well as securing to an aperture 90 defined in a three-dimensional cover plate 92 for securing the pendulum in sandwiching fashion between the stanchion and seat pivot bracket. Additional mounting rivets 89 secure through associated apertures 91 in the stanchion support 18 and engage edge locations 93 of the three-dimensional cover 92 to secure the cover in position proximate the sandwiched batwing sector 46 and pendulum 80 components.

An upper and slightly arcuate edge configuration 94 of the pendulum 80 selectively seats in a given proximate location associated with either of the bottom extending surfaces 52 and 54 of the rotatable sector 46, and on a given abutting side of the central shoulder projection 56, depending upon a rotatable position established between the first seat component 12 and the second seat component 14. The pendulum 80 further includes a weighted end portion 96 extending from its pivot connection 82, a weighted rivet 98 mounting to an aperture defined in the weighted end portion 96. In this fashion, the pendulum 80 responds to an inertial impact condition by engaging a selected side of the shoulder projection 56 associated with the slaved sector 46, in order to prevent rotation of the first seat component 12 typically from the upwardly rotated and stowed position, as shown in FIG. 2, during a forward impact or rapid deceleration. The pendulum also prevents upward rotation of seat component 12, from the seated position (FIG. 1) during a rear impact occurrence.

An inertial responsive leaf spring 100 is secured to the batwing sector 46 in substantially aligning and interposing fashion between the first 52 and second 54 bottom extending surfaces. A sector rivet 102 engages through a central mounting location associated with the leaf spring 100 and an adjoining mounting hole 104 defined in a lower location of the batwing sector, in order to secure to the shoulder projection of the seat sector. First and second outwardly extending wing portions associated with the leaf spring 100, see at 106 and 108, are secured in closely spaced fashion relative to the bottom surfaces 52 and 54 of the sector. Additional detail in the configuration and operation of the leaf spring will be explained in the following description of FIG. 9.

In operation, the downward bias exerted by the detent lever extending pin 78, seating in the communicating channel portions 60, 62 and 64, is counteracted by the slaved rotating motion of the batwing 46. Upon release of the bracket 26, such as actuated by physically moving seat bottom 12 away from the design or stowed positions, the bracket rotates in actuating fashion against the biasing effect of the spring loaded detent pin 78 and lever 66, as the pin 78 is forced out of the slots 62 and 64. The top end 116 of tether cable 110 is secured to the seat frame 12 and does not affect function of the mechanism or bias anything.

Rotation of the seat bracket 26 and batwing sector 46, from the design position of FIG. 1 to the stowed position of FIG. 2 (see also FIG. 7), causes the biasing pin 78 to successively travel from reverse arcuate portion 62, through central arcuate portion 60, and finally to seat within the reverse arcuate portion 64. The downward bias exerted by the pin 78 creates a minimal degree of resistance at the reverse bend locations associated with the boundary zones established between main channel portion 60 and the reverse angled end channel portions 62 and 64 of the batwing 46, this causing a degree of tactile engagement of the bracket in either the design or upright stowed position, and from which a desired minimal degree of force is required to actuate the seat bottom 12 in rotating fashion between the two positions.

It is one desired feature of the present invention to provide a degree of tactile engaging feel at each of the design (FIG. 5) and stowed (FIG. 7) positions, this provided by the effect of the (downward) biasing pin 78 passing through the reverse bend seating locations in the sector arcuate channel (i.e. between communicating sections 60 and 62 as well as 60 and 64). The architecture between the bottom surfaces 52 and 54 and central projection 56 of the batwing 46 and those of the upper surface 94 of the pendulum 80 (with interposed inertial leaf spring 100) enable the pendulum 80 to pivot the desired degree out of the way of the slaved rotating sector 46, and while providing the necessary inertial impacting and locking effect. This occurs regardless of whether the seat is in the design or stowed position, and at which the associated upper edge of the pendulum would be rotated slightly into engagement with the central shoulder projection 56 of the batwing from either bottom surface 52 or 54. Accordingly, the complementing architecture of the batwing sector and pendulum prevents rotation of the seat component 12 either upwardly from the design to stowed position (resulting from a rearward impact occurrence) or downwardly from the stowed to design portions (resulting from a forward impact occurrence).

Additional features associated with the present invention include the provision of a needle shaped and rubberized motion dampening projection, see at 120 in FIG. 4, and which extends through an aperture 122 in the stanchion support 18 from a reverse side, in order to contact a lower end location associated with the weighted end portion 96 of the pendulum 80. In this fashion, an extending edge portion of the rubberized dampening (or bumper) portion 120 provides a desired minimal degree of resistive support to the pendulum 80 and to prevent it from oscillating and creating clunking or other noises (resulting from minor pivoting variations) caused by the upper surface 94 of pendulum 80 contacting the center projection 56 of sector 46 as the two components pass by each other during articulation of the seat bracket and batwing sector.

An angularly (substantially boomerang) shaped component is further illustrated at 122, and is pivotally connected at extending side locations 124 and 126, to the second seat component 14 (seat back). A further location, see connecting rivet 128, associated with an opposite extending end of the boomerang shaped component 122 is rotatably secured to a pivoting outer location associated with the rotating bracket (see as further shown in FIG. 3). The configuration of the angular bracket 122 is such that, upon rotation of the bracket 26 and slaved planar shaped sector 46, a degree of rearward angular displacement of the second seat (back) component is achieved (see again positions 14 and 14' in FIG. 2), and which is concurrent with the slaved rotation of the batwing seat sector, indicating upwardly folding of the first seat component to a stowed position.

This again is in order to provide for a more secure holding arrangement of the stadium-style seat in the stowed position, and by which the seat bottom 12 can be rotated an incrementally greater degree than if the seat back 14 were not capable of being rearwardly displaced in concurrent fashion. It is also understood that the angular connecting bracket for actuating the seat back 14 in the manner described is an additional and optional feature of the present invention.

Figure 9:
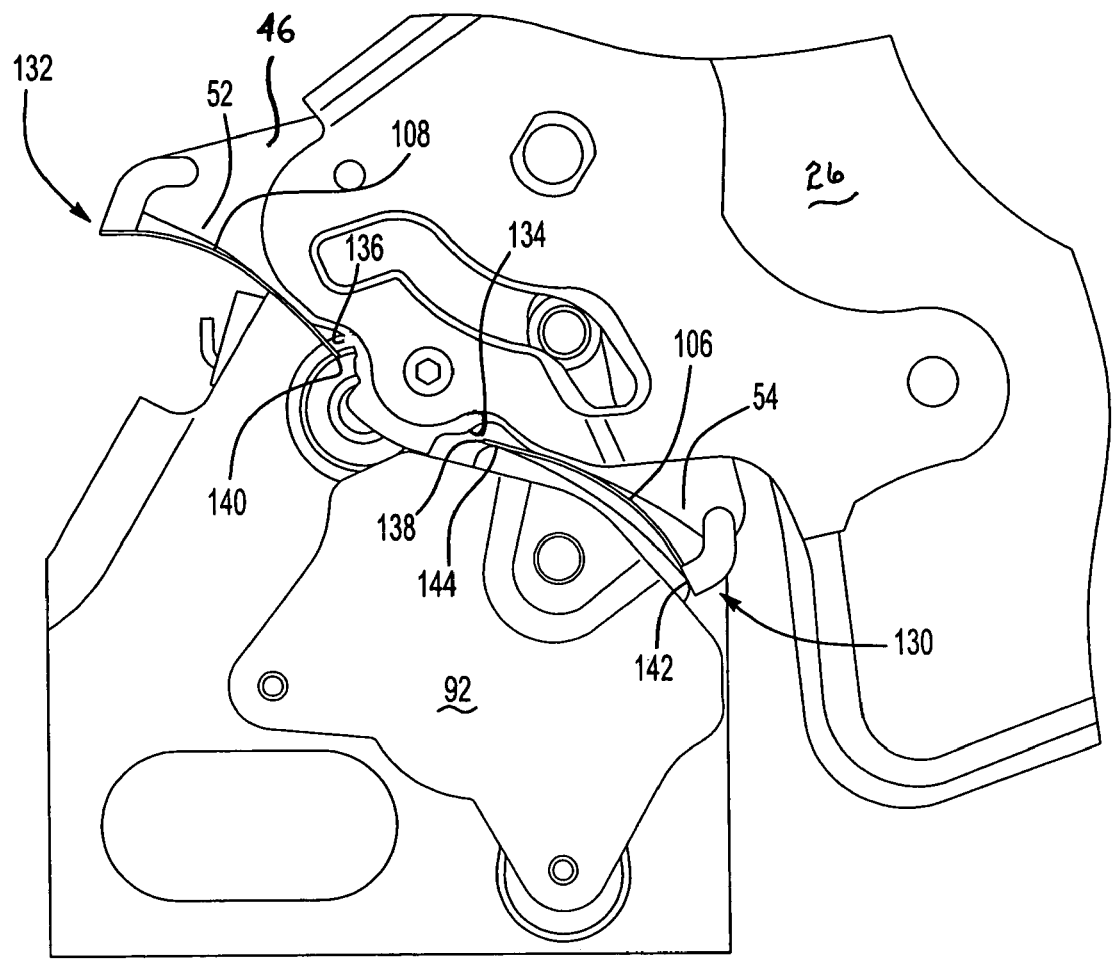
FIG. 9 is an enlarged cutaway view of the leaf spring component in use with the present invention.

Referring to FIG. 9, outer ends 130, 132 of the leaf spring extend away from sector surfaces 54, 52 when the seat bracket 26 is not in the design (seated) or upright (stowed) positions. The sector 46 has recessed notches 134, 136 located behind leaf spring ends 138, 140.

As the seat bracket 26 and sector 46 are articulated from the stowed position (FIG. 2) to the design seated position (FIG. 1), the leaf spring end 130 initially contacts a point 142 of the pendulum 80, which is hanging in an unbiased vertical orientation. This rapidly accelerates pendulum 80 clockwise so that point 144 contacts leaf spring end 138.

The noise emitted from the pendulum contacting both ends of the leaf spring is small, due to the small mass of the leaf spring and the clearance gaps existing between the leaf spring and sector 46. As the seat bracket 26 and sector 46 continue to travel to the final design (seated) position, the leaf spring end 106 is compressed so that sector surface 54 and leaf spring end 106 and pendulum surface 94 are all in contacting proximity.

Likewise, as the seat bracket 26 and sector 46 are articulated toward the stowed position, the leaf spring end 132 contacts pendulum point 144, which accelerates pendulum point 142 counterclockwise to contact leaf spring end 140. Then leaf spring surface 108 is compressed so that sector surface 52 and leaf spring surface 108 and pendulum surface 94 are all in contacting proximity.

Having described my invention, other and additional preferred embodiments will become apparent to those skilled in the art to which it pertains, and without deviating from the scope of the appended claims.

We claim:

1. A latch assembly incorporated into a vehicle seat including a stanchion support adapted to be secured to a floor location and a bracket pivotally secured to the stanchion support, a first rotatable seat component secured to the bracket, said latch assembly comprising:

a substantially planar shaped sector slaved in rotating fashion with the bracket and arranged in sandwiching fashion between the bracket and the stanchion support, said sector exhibiting a bottom extending surface further including a central projecting shoulder portion separating the bottom extending surface into first and second bottom extending surfaces, said sector further exhibiting an arcuate interior channel which is offset from a slaved rotating connection of said sector to the bracket, a pin extending through a further second channel defined in the stanchion support and seating within said arcuate channel, said pin exerting a bias against said sector during travel along said interior channel; and a pendulum secured in sandwiching fashion between the bracket and stanchion, said pendulum exhibiting an arcuate edge seating against one of said first and second bottom extending surfaces of said rotatable sector, depending upon a position established between the first seat component and a second seat component;

said pendulum responding to an inertial impact condition by engaging said shoulder projection of said slaved sector and to prevent rotation of the first seat component.

2. The latch assembly as described in claim 1, further comprising a detent lever biasingly and rotatingly secured against a surface of the stanchion support opposite said sector and pendulum, said pin extending from said detent lever through said second channel defined in the stanchion support and which extends in a combined communicating and offsetting fashion relative to said sector channel.

3. The latch assembly as described in claim 2, further comprising a clock spring rotatively biasing a pivot pin pivotally associating the bracket to the stanchion support and including an extending end engaging said detent lever to simultaneously bias the bracket and slaved sector, as well as said detent lever with respect to the stanchion support.

4. The latch assembly as described in claim 1, further comprising an inertial responsive leaf spring secured to said planar shaped sector between said first and second bottom extending surfaces and said arcuate edge of said pendulum, said leaf spring being initially spaced away from said sector upon contacting said pendulum, said leaf spring being compressed to align with said first and second bottom extending surfaces and said arcuate edge of said pendulum.

5. The latch assembly as described in claim 1, further comprising a three-dimensional shaped cover plate secured to the stanchion support and providing a combined level of support and limited pivoting motion associated with said pendulum.

6. The latch assembly as described in claim 5, further comprising a weighted rivet secured to an end portion of said pendulum extending from a pivot point thereof.

7. The latch assembly as described in claim 6, said arcuate edge of said pendulum extending from a spaced location from said pivot point opposite a weighted end portion.

8. The latch assembly as described in claim 7, further comprising a rubberized motion dampening projection extending from the stanchion support and contacting a location of said weighted end portion of said pendulum when said pendulum is in a mid-navel location.

9. The latch assembly as described in claim 1, further comprising an angularly shaped component pivotally connected at one extending edge to an upper end location of said pivot bracket, the second seat component being fixedly secured to angularly redirected portion associated with said component.

10. The latch assembly as described in claim 9, said angularly shaped component having a specified shape and size and further comprising, upon rotation of said bracket and slaved planar shaped sector, a degree of rearward angular displacement of the second seat component concurrent with upwardly folding of the first seat component to a stowed position.

11. The latch assembly as described in claim 10, said first and second seat components each exhibiting a specified shape and size and further comprising, respectively, a seat bottom and seat back.

12. The latch assembly as described in claim 1, further comprising a cable tether connected at a first end to a location associated with the pivotal bracket and at a second end to the stanchion support.

13. The latch assembly as described in claim 1, said arcuate interior channel exhibiting a specified shape and size and further comprising a middle arcuate portion and first and second reverse arcuate extending end portions, corresponding to use and stowed positions of the first rotatable seat component.

14. The latch assembly as described in claim 1, first and second pairs of spaced apart stanchion supports and pivotal brackets being arranged on opposite ends of first and second seat components associated with a 60/40 rear stadium seat assembly, a first latch assembly being arranged on a first side of a first selected seat component, a second latch assembly being arranged on a second opposite side of a second selected seat component.

15. A vehicle seat assembly, comprising:
at least one pair of spaced apart stanchion supports, each pivotally supporting a bracket, a seat bottom securing in rotative fashion between said brackets;
a planar shaped sector exhibiting an outer profile with first and second angled sides interconnected by first and second bottom extending surfaces interrupted by an intermediate shoulder projection, said sector being slaved in rotating fashion with a selected one of said brackets and arranged in sandwiching fashion between said bracket and said stanchion support;
said sector further comprising an arcuate interior channel offset from a slaved rotating connection of said sector to said bracket, said arcuate channel including a middle arcuate portion and first and second reverse arcuate extending end portions, corresponding to use and stowed positions associated with the first seat component;
a pin extending through a second channel defined in said stanchion support and seating within said arcuate channel in said sector, said pin exerting a bias against said sector during travel along said interior channel corresponding to rotation of said seat component; and
a pendulum secured in sandwiching fashion between said bracket and stanchion and including an arcuate edge seating aaainst one of said first and second bottom extending surfaces of said rotatable sector, depending upon a position established between the seal bottom and a seat back;
said pendulum responding to an inertial impact condition by engaging said shoulder projection associated with said slaved sector and to prevent rotation of the first seat component.

16. The vehicle seat assembly as described in claim 15, further comprising a detent lever biasingly and rotatingly secured against a surface of the stanchion support opposite said sector and pendulum, said pin extending from said detent lever through said second channel defined in the stanchion support and which extends in a combined communicating and offsetting fashion relative to said sector channel.

17. The vehicle seat assembly as described in claim 15, further comprising an inertial responsive leaf spring secured to said sector in substantially aligning and interposing fashion between first and second bottom extending surfaces separated by said shoulder projection of said seat sector and said proximate located upper edge configuration of said pendulum, said leaf spring being initially spaced away from said sector upon contacting said pendulum, said leaf spring being compressed to align with said sector surfaces and upper edge of said pendulum.

18. The vehicle seat assembly as described in claim 15, further comprising a weighted rivet secured to an end portion of said pendulum extending from a pivot point thereof, said arcuate edge of said pendulum extending from a spaced location from said pivot point, opposite a weighted end portion.

19. The vehicle seat assembly as described in claim 18, further comprising a rubberized motion dampening projection extending from the stanchion support and contacting a location of said weighted end portion of said pendulum, when said pendulum is in a mid-travel location.

20. A latch assembly incorporated into a vehicle seat, the seat having a stanchion support adapted secured to a floor location and a bracket pivotally associated with the stanchion support and supporting an end of a rotatable seat component, said latch assembly comprising:

planar shaped sector slaved in rotating fashion with the bracket and arranged in sandwiching fashion between the bracket and die stanchion support, said sector exhibiting a bottom extending surface interrupted by a shoulder projection of said sector and separating the bottom extending surface into first and second bottom extending surfaces, and an arcuate interior channel defined in said sector which is offset from a slaved rotating connection of said sector to the bracket, a pin extending through a second channel defined in the stanchion support and seating within said arcuate channel to exert a bias against said sector during travel along said interior channel; and a pendulum secured in sandwiching fashion between the bracket and stanchion, said pendulum exhibiting an arcuate edge seating against one of said first and second bottom extending surfaces of said rotatable sector, said pendulum responding to an inertial impact condition by rotating to engage against said shoulder projection of said slaved sector and to prevent rotation of the seat component.

* * * * *

UNITED STATES PATENT AND TRADEMARK OFFICE
CERTIFICATE OF CORRECTION

PATENT NO. : 7,374,242 B2
APPLICATION NO. : 11/439665
DATED : May 20, 2008
INVENTOR(S) : William Champ and David Grable It is certified that error appears in the above-identified patent and that said Letters Patent is hereby corrected as shown below:

Column 6, line 9, replace "a defined" with --a second channel 81 defined--

Column 8, line 63, delete "further"

Column 10, line 44, replace "aaainst" with --against--

Column 10, line 46, replace "seal" with --seat--

Column 11, line 19, replace "planar" with --a planar--

Column 11, line 21, replace "die" with --the--

Signed and Sealed this

Twenty-ninth Day of September, 2009

David J. Kappos
*Director of the United States Patent and Trademark Office*